United States Patent
Chen et al.

(10) Patent No.: US 8,672,598 B2
(45) Date of Patent: Mar. 18, 2014

(54) SCREW POST

(71) Applicant: Wistron Corporation, New Taipei (TW)

(72) Inventors: Dong-Ying Chen, New Taipei (TW); Zhong-hui Mao, New Taipei (TW)

(73) Assignee: Wistron Corporation, Hsichih, New Tapiei (TW)

( * ) Notice: Subject to any disclaimer, the term of this patent is extended or adjusted under 35 U.S.C. 154(b) by 0 days.

(21) Appl. No.: 13/662,564

(22) Filed: Oct. 29, 2012

(65) Prior Publication Data

US 2013/0330149 A1  Dec. 12, 2013

(30) Foreign Application Priority Data

Jun. 7, 2012 (CN) .......................... 2012 1 0186907

(51) Int. Cl.
*F16B 39/22* (2006.01)

(52) U.S. Cl.
USPC .......................................... 411/301; 411/437

(58) Field of Classification Search
USPC ......... 411/266, 267, 276, 295, 301, 304, 324, 411/333, 334, 436, 437, 928
See application file for complete search history.

(56) References Cited

U.S. PATENT DOCUMENTS

| | | | | |
|---|---|---|---|---|
| 786,725 A | * | 4/1905 | Bryce | 411/266 |
| D134,789 S | * | 1/1943 | Gade | D8/397 |
| D157,484 S | * | 2/1950 | Gade | D8/397 |
| 2,983,180 A | * | 5/1961 | Sygnator | 411/436 |
| 3,221,790 A | * | 12/1965 | Poupitch | 411/301 |
| 3,496,800 A | * | 2/1970 | Brezinski | 74/586 |
| 4,055,929 A | * | 11/1977 | Stancati et al. | 52/705 |
| 4,802,804 A | * | 2/1989 | Hirohata | 411/433 |
| 4,832,551 A | * | 5/1989 | Wollar | 411/280 |
| 5,139,380 A | * | 8/1992 | Reynolds | 411/437 |
| 5,249,901 A | * | 10/1993 | Moore | 411/182 |
| 5,411,228 A | * | 5/1995 | Morawa et al. | 248/74.5 |
| 5,499,449 A | * | 3/1996 | Carter et al. | 29/882 |
| 5,520,423 A | | 5/1996 | Finkelstein | |
| 5,927,920 A | * | 7/1999 | Swanstrom | 411/180 |
| 5,980,177 A | * | 11/1999 | Schiess et al. | 411/299 |
| 6,406,238 B2 | * | 6/2002 | Takeuchi et al. | 411/188 |
| 6,540,462 B1 | * | 4/2003 | Bretschneider et al. | 411/82 |
| 7,229,239 B2 | * | 6/2007 | Koessler | 411/437 |

* cited by examiner

*Primary Examiner* — Roberta DeLisle

(74) *Attorney, Agent, or Firm* — Winston Hsu; Scott Margo

(57) ABSTRACT

A screw post is detachably screwed with a self-tapping screw. The screw post includes a post body and a rib structure. The post body has an approximately triangular hollow structure formed therein. The approximately triangular hollow structure has three arc-shaped sides. The rib structure protrudes from an outer surface of the post body corresponding to at least one of the three arc-shaped sides in an axially-extending manner. The self-tapping screw is screwed into the approximately triangular hollow structure.

7 Claims, 6 Drawing Sheets

SCREW POST

BACKGROUND OF THE INVENTION

1. Field of the Invention

The present invention relates to a screw post, and more specifically, to a screw post utilizing cooperating of an approximately triangular hollow structure formed therein with reinforcement ribs for preventing itself from cracking.

2. Description of the Prior Art

In general, a self-tapping screw utilizes its positive threads to generate corresponding negative threads on an inner wall of a screw hole so as to be screwed into the screw hole tightly. Chips cut by the positive threads of the self-tapping screw may clog up between the positive threads and the negative threads so as to apply a radial pushing force upon the screw post. Thus, the screw post could receive a considerable circumferential stress. When the aforesaid circumferential stress is excessive, the screw post may crack accordingly.

For solving the aforesaid problem, a crack preventing design could be applied to the self-tapping screw. For example, in the prior art, one cutting opening (or more) is formed at the bottom end of the self-tapping screw. As a result, chips cut by the positive threads of the self-tapping screw may fall onto the bottom of the screw hole via the cutting opening instead of clogging up between the positive threads of the self-tapping screw and the negative threads of the screw hole, so as to reduce the aforesaid circumferential stress. In another example, the sectional contour of the self-tapping screw could be an approximate triangle. As a result, the space between the sides of the approximately triangular section of the self-tapping screw and the inner wall of the screw hole could be utilized to contain more chips cut by the positive threads of the self-tapping screw, so that the aforesaid circumferential stress could also be reduced. However, all the aforesaid designs may increase the manufacturing cost of the screw post.

The prior art could also utilize a design in which reinforcement ribs are additionally disposed on the outer surface of the screw post. For example, please refer to FIG. 1, which is a diagram of a screw post 10 according to the prior art. As shown in FIG. 1, the screw post 10 includes a post body 12 and four reinforcement ribs 14. The post body 12 has a cylindrical hollow structure 16. The four reinforcement ribs 14 protrude from an outer surface 18 of the post body 12 in an axial-extending manner and are arranged radially. In such a manner, via disposal of the four reinforcement ribs 14, the maximum circumferential stress that the screw post 10 could withstand is accordingly increased. However, this design may also increase the manufacturing cost of the screw post 10. Furthermore, this design could only provide the screw post 10 with a partial reinforcement effect. Thus, this design could not efficiently prevent cracking of the screw post 10 since the aforesaid circumferential stress is distributed uniformly along the outer surface 18 of the screw post 10.

Furthermore, since the screw post is usually formed by an injection forming process in the prior art, a weld line would be accordingly formed at a position of the screw post where its structural strength is lower. Therefore, the screw post may crack easily at the position corresponding to the aforesaid weld line.

SUMMARY OF THE INVENTION

An embodiment of the invention provides a screw post detachably screwed with a self-tapping screw. The screw post includes a post body and a rib structure. The post body has an approximately triangular hollow structure formed therein. The approximately triangular hollow structure has three arc-shaped sides. The rib structure protrudes from an outer surface of the post body corresponding to at least one of the three arc-shaped sides in an axially-extending manner. The self-tapping screw is screwed into the approximately triangular hollow structure.

An embodiment of the invention further provides a screw post detachably screwed with a self-tapping screw. The screw post includes a post body and a rib structure. The post body has an approximately polygon hollow structure formed therein. The approximately polygon hollow structure has at least four arc-shaped sides. The rib structure protrudes from an outer surface of the post body corresponding to at least one of the four arc-shaped sides in an axially-extending manner. The self-tapping screw is screwed into the approximately polygon hollow structure.

An embodiment of the invention further provides a screw post detachably screwed with a self-tapping screw. The screw post includes a post body and a rib structure. The post body has an approximately cylindrical hollow structure formed therein and at least two axial slots. The two axial slots are formed on an inner wall of the approximately cylindrical hollow structure. The rib structure protrudes from an outer surface of the post body in an axially-extending manner and is arranged radially with the two axial slots. The self-tapping screw is screwed into the approximately cylindrical hollow structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
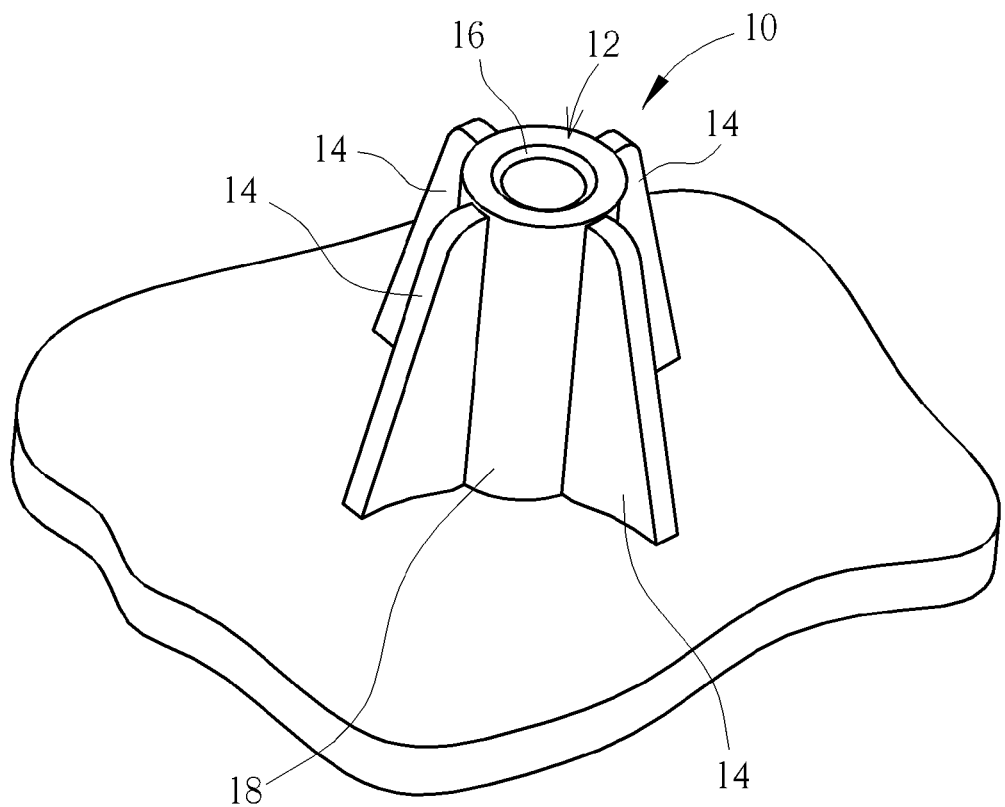
FIG. 1 is a diagram of a screw post according to the prior art.
Figure 2:
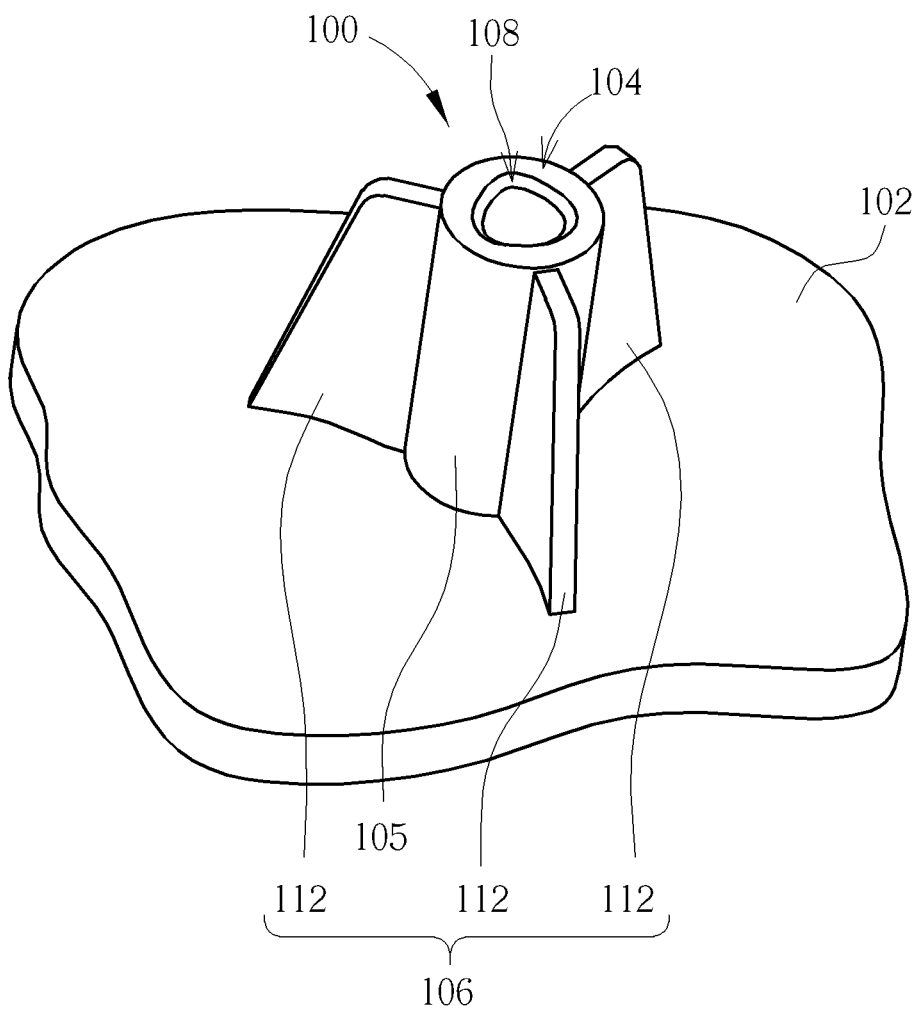
FIG. 2 is a diagram of a screw post according to an embodiment of the invention.
Figure 3:
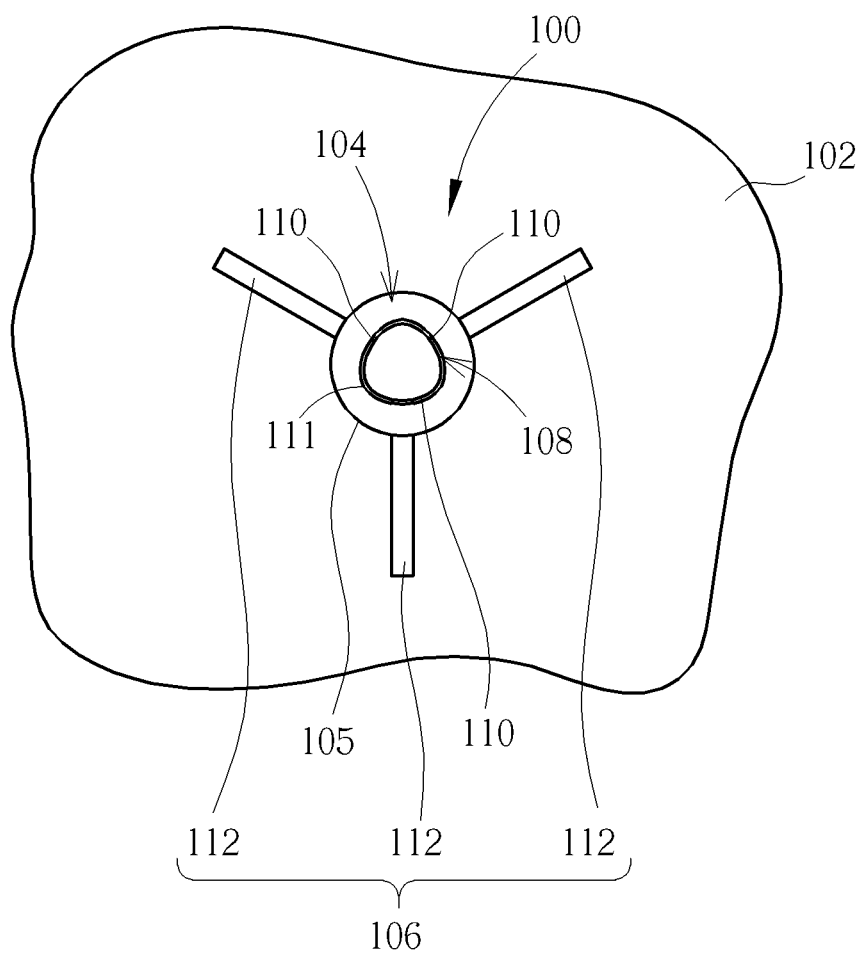
FIG. 3 is a top view of the screw post in FIG. 2.

Please refer to FIG. 2 and FIG. 3. FIG. 2 is a diagram of a screw post 100 according to an embodiment of the invention. FIG. 3 is a top view of the screw post 100 in FIG. 2. In this embodiment, the screw post 100 could be integrally formed with a plate 102 (e.g. a plastic plate) for screwing with a self-tapping screw (e.g. a standard self-tapping screw, a self-tapping screw with cutting openings, or a self-tapping screw having an approximately triangular section) so as to cooperatively fix an object (e.g. a plastic part) onto the plate 102, but is not limited thereto. That is to say, the screw post 100 could also be an independent part instead to be detachably disposed on the plate 102. As for which design is utilized, it depends on the practical application of the screw post 100.

More detailed description for the structural design of the screw post 100 is provided as follows. As shown in FIG. 2 and FIG. 3, the screw post 100 includes a post body 104 and a rib structure 106. The post body 104 has an approximately triangular hollow structure 108 formed therein. The approximately triangular hollow structure 108 has three arc-shaped sides 110. The rib structure 106 protrudes from an outer surface 105 of the post body 104 corresponding to at least one of the three arc-shaped sides 110 in an axial-extending manner. To be more specific, in this embodiment, the rib structure 106 could include three reinforcement ribs 112 (but not limited thereto). The three reinforcement ribs 112 are disposed on the outer surface 105 of the post body 104 corresponding to the three arc-shaped sides 110 respectively.

Via the aforesaid design, each vertex angular space 111 located between two adjacent arc-shaped sides 110 of the approximately triangular hollow structure 108 could contain more chips cut by positive threads of a self-tapping screw when the self-tapping screw is screwed into the approximately triangular hollow structure 108. Accordingly, the circumferential stress that the screw post 100 withstands could be efficiently reduced. Furthermore, via disposal of the three reinforcement ribs 112 corresponding to the three arc-shaped sides 110 of the approximately triangular hollow structure 108 where the screw post 100 withstands a greater circumferential stress, the maximum circumferential stress that the screw post 100 could withstand is accordingly increased. In such a manner, the prevent invention could efficiently solve the problem that the screw post could easily crack aforementioned in the prior art.

Furthermore, in general, a weld line is usually formed at a position of a screw post where the screw post has a greater thickness during the screw post is formed by an injection forming process. As shown in FIG. 3, since the screw post 100 utilizes the aforesaid design in which the three reinforcement ribs 112 are disposed on the screw post 100 corresponding to the three arc-shaped sides 110 of the approximately triangular hollow structure 108 where the screw post 100 has a greater thickness, the present invention could also solve the problem that the screw post may crack easily at the position corresponding to the weld line aforementioned in the prior art. Furthermore, since there is no need to utilize a special self-tapping screw (e.g. a self-tapping screw with cutting openings or a self-tapping screw having an approximately triangular section) to screw with the screw post 100 for preventing cracking of the screw post 100, the present invention could further reduce the related cost needed for preventing cracking of the screw post 100.

The structural design of the screw post and disposal of the reinforcement ribs are not limited to the aforesaid embodiment. For example, please refer to FIG. 4, which is a diagram of a screw post 100' according to another embodiment of the invention. Components both mentioned in this embodiment and the aforesaid embodiment represent components with similar functions or structures, and the related description is omitted herein. The major difference between the screw post 100' and the screw post 100 is the hollow structure of the screw post 100'. The screw post 100' could be integrally formed with the plate 102 for screwing with a self-tapping screw (e.g. a standard self-tapping screw, a self-tapping screw with cutting openings, or a self-tapping screw having an approximately triangular section) so as to cooperatively fix an object (e.g. a plastic part) onto the plate 102, but is not limited thereto. That is to say, the screw post 100' could also be an independent part instead to be detachably disposed on the plate 102.

Figure 4:
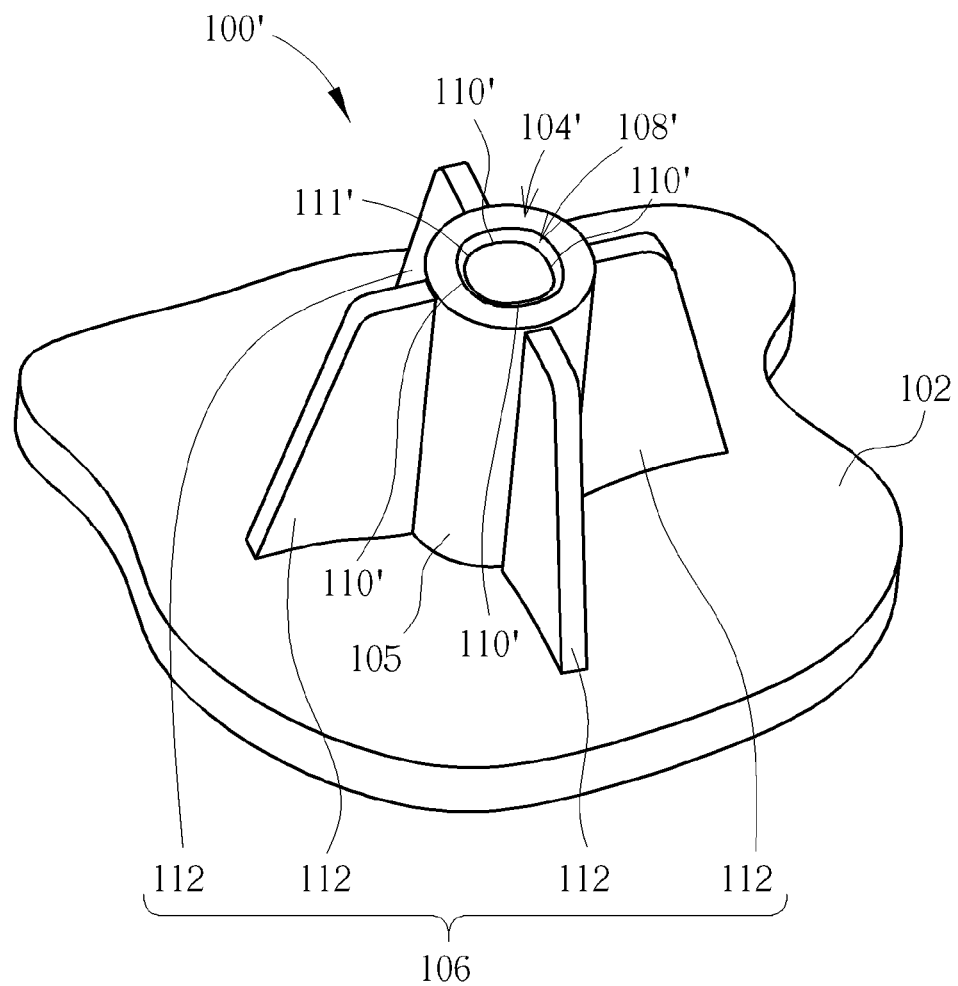
FIG. 4 is a diagram of a screw post according to another embodiment of the invention.

As shown in FIG. 4, the screw post 100' includes a post body 104' and the rib structure 106. The post body 104' has an approximately polygon hollow structure 108'. In this embodiment, the approximately polygon hollow structure 108' preferably has four arc-shaped sides 110', meaning that the sectional contour of the approximately polygon hollow structure 108' is an approximate quadrangle. The rib structure 106 protrudes from an outer surface 105 of the post body 104 corresponding to at least one of the four arc-shaped sides 110 in an axial-extending manner. To be more specific, in this embodiment, the rib structure 106 could include four reinforcement ribs 112 (but not limited thereto). The four reinforcement ribs 112 are disposed on the outer surface 105 of the post body 104 corresponding to the four arc-shaped sides 110 respectively. To be noted, the sectional contour of the approximately polygon hollow structure 108' is not limited to the approximate quadrangle as shown in FIG. 4. That is to say, the approximately polygon hollow structure 108' could utilize other polygon sectional contour (e.g. a pentagon or a hexagon) instead, and number of the reinforcement ribs 112 of the rib structure 106 could be increased correspondingly.

Via the aforesaid design, an angular area 111' located between two adjacent arc-shaped sides 110' of the approximately polygon hollow structure 108' could contain more chips cut by positive threads of a self-tapping screw when the self-tapping screw is screwed into the approximately polygon hollow structure 108'. Accordingly, the circumferential stress that the screw post 100 withstands could be efficiently reduced. Furthermore, via disposal of the four reinforcement ribs 112 corresponding to the four arc-shaped sides 110' of the approximately polygon hollow structure 108' where the screw post 100' withstands a greater circumferential stress, the maximum circumferential stress that the screw post 100' could withstand is accordingly increased.

Figure 5:
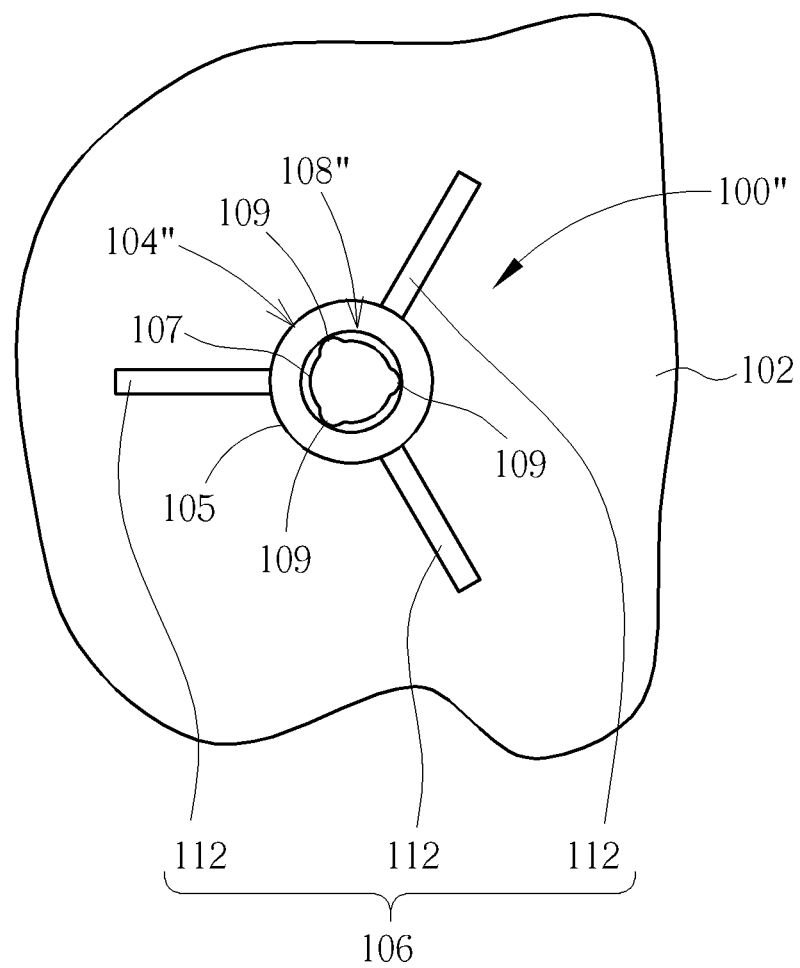
FIG. 5 is a diagram of a screw post according to another embodiment of the invention.

Please refer to FIG. 5, which is a diagram of a screw post 100" according to another embodiment of the invention. Components both mentioned in this embodiment and the aforesaid embodiment represent components with similar functions or structures, and the related description is omitted herein. The major difference between the screw post 100" and the screw post 100 is the hollow structure of the screw post 100". The screw post 100" could be integrally formed with the plate 102 for screwing with a self-tapping screw (e.g. a standard self-tapping screw, a self-tapping screw with cutting openings, or a self-tapping screw having an approximately triangular section) so as to cooperatively fix an object (e.g. a plastic part) onto the plate 102, but is not limited thereto. That is to say, the screw post 100" could also be an independent part instead to be detachably disposed on the plate 102.

As shown in FIG. 5, the screw post 100" includes a post body 104" and the rib structure 106. The post body 104" has a cylindrical hollow structure 108" and three axial slots 109. The three axial slots 109 are formed on an inner wall 107 of the cylindrical hollow structure 108". In this embodiment, the rib structure 106 includes three reinforcement ribs 112 (but not limited thereto). The three reinforcement ribs 112 protrude from the outer surface 105 of the post body 104" in an axial-extending manner and are radially arranged with the three axial slots 109.

Via the aforesaid design, the cylindrical hollow structure 108" could utilize the three axial slots 109 to contain more chips cut by positive threads of a self-tapping screw when the self-tapping screw is screwed into the cylindrical hollow structure 108". Accordingly, the circumferential stress that the screw post 100" withstands could be efficiently reduced. Furthermore, via radial arrangement of the three reinforcement ribs 112 with the three axial slots 109, the maximum circumferential stress that the screw post 100" could withstand is accordingly increased.

Figure 6:
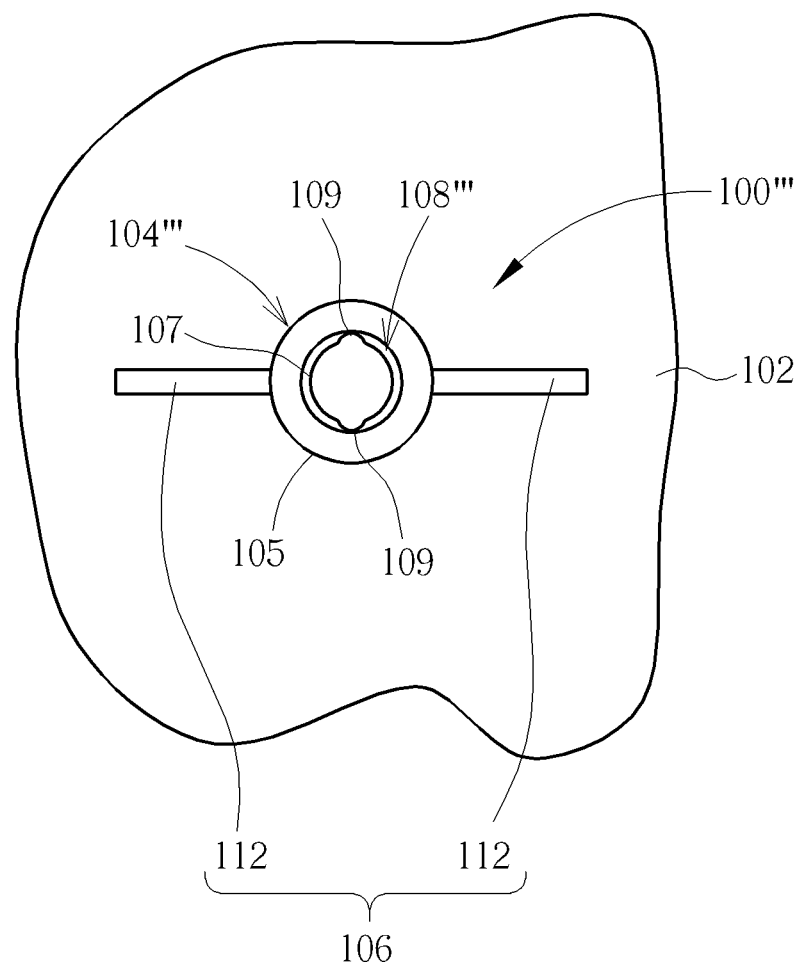
FIG. 6 is a top view of a screw post according to another embodiment of the invention.

It should be mentioned that number of the axial slots of the aforesaid cylindrical hollow structure and number of the reinforcement ribs of the aforesaid rib structure are not limited to the aforesaid embodiment. For example, please refer to FIG. 6, which is a top view of a screw post 100''' according to another embodiment of the invention. Components both mentioned in this embodiment and the aforesaid embodiment represent components with similar functions or structures. As shown in FIG. 6, the screw post 100''' includes a post body 104''' and the rib structure 106. The post body 104''' has a cylindrical hollow structure 108''' and two axial slots 109. The two axial slots 109 are formed on the inner wall 107 of the cylindrical hollow structure 108'''. In this embodiment, the rib structure 106 includes two reinforcement ribs 112 (but not limited thereto). The two reinforcement ribs 112 protrude from the outer surface 105 of the post body 104''' in an axial-extending manner and are radially arranged with the two axial slots 109. Accordingly, the purpose of increasing the maximum circumferential stress that the screw post 100''' could withstand and the purpose of utilizing the two axial slots 109 to contain more chips cut by positive threads of a self-tapping screw could be both achieved. As for other related description and other derivative embodiments, they could be reasoned according to the aforesaid embodiment.

Compared with the prior art utilizing a cylindrical hollow structure of a screw post to cooperate with four reinforcement ribs, the present invention utilizes an approximately triangular hollow structure of a screw post with three reinforcement ribs to reduce the circumferential stress that the screw post withstands, and further to increase the maximum circumferential stress that the screw post could withstand, so as to solve the prior art problem that the screw post cracks easily. Furthermore, since the screw post of the present invention only utilizes the three reinforcement ribs to be disposed on the screw post corresponding to the three arc-shaped sides of the approximately triangular hollow structure, the material cost of the screw post in disposal of the reinforcement ribs could be reduced accordingly and the prior art problem that the screw post may crack easily at the position of the screw post corresponding to the weld line could be further solved. Furthermore, the present invention could also utilize an approximately polygon hollow structure to cooperate with reinforcement ribs, or utilize axial slots formed in a cylindrical hollow structure to cooperate with reinforcement ribs, for reducing the circumferential stress that the screw post withstands and increasing the maximum circumferential stress that the screw post could withstand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A screw post detachably screwed with a self-tapping screw, the screw post comprising:
   a post body being a cylindrical shape and having a triangular hollow structure formed on an inner surface of the post body, the triangular hollow structure having three arc-shaped sides; and
   a rib structure outwardly protruding from an outer surface of the post body and aligning with a center section of at least one of the three arc-shaped sides in an axially-extending manner;
   wherein the self-tapping screw is screwed into the triangular hollow structure.

2. The screw post of claim 1, wherein the rib structure includes three reinforcement ribs respectively disposed at the outer surface of the post body corresponding to the three arc-shaped sides.

3. A screw post detachably screwed with a self-tapping screw, the screw post comprising:
   a post body being a cylindrical shape and having a polygon hollow structure formed an inner surface of the post body, the polygon hollow structure having at least four arc-shaped sides; and
   a rib structure outwardly protruding from an outer surface of the post body and aligning with a center section of at least one of the four arc-shaped sides in an axially-extending manner;
   wherein the self-tapping screw is screwed into the polygon hollow structure.

4. The screw post of claim 3, wherein a sectional contour of the polygon hollow structure is an quadrangle.

5. A screw post detachably screwed with a self-tapping screw, the screw post comprising:
   a post body having a cylindrical hollow structure formed therein and at least two axial slots, the two axial slots being formed on an inner wall of the cylindrical hollow structure; and
   a rib structure outwardly protruding from an outer surface of the post body in an axially-extending manner and arranged alternately with the two axial slots;
   wherein the self-tapping screw is screwed into the cylindrical hollow structure.

6. The screw post of claim 5, wherein the post body has two axial slots, the rib structure includes two reinforcement ribs, and the two reinforcement ribs are disposed on the outer surface of the post body and arranged alternately with the two axial slots.

7. The screw post of claim 5, wherein the post body has three axial slots, the rib structure includes three reinforcement ribs, and the three reinforcement ribs are disposed on the outer surface of the post body and arranged alternately with the three axial slots.

* * * * *